UNITED STATES PATENT OFFICE.

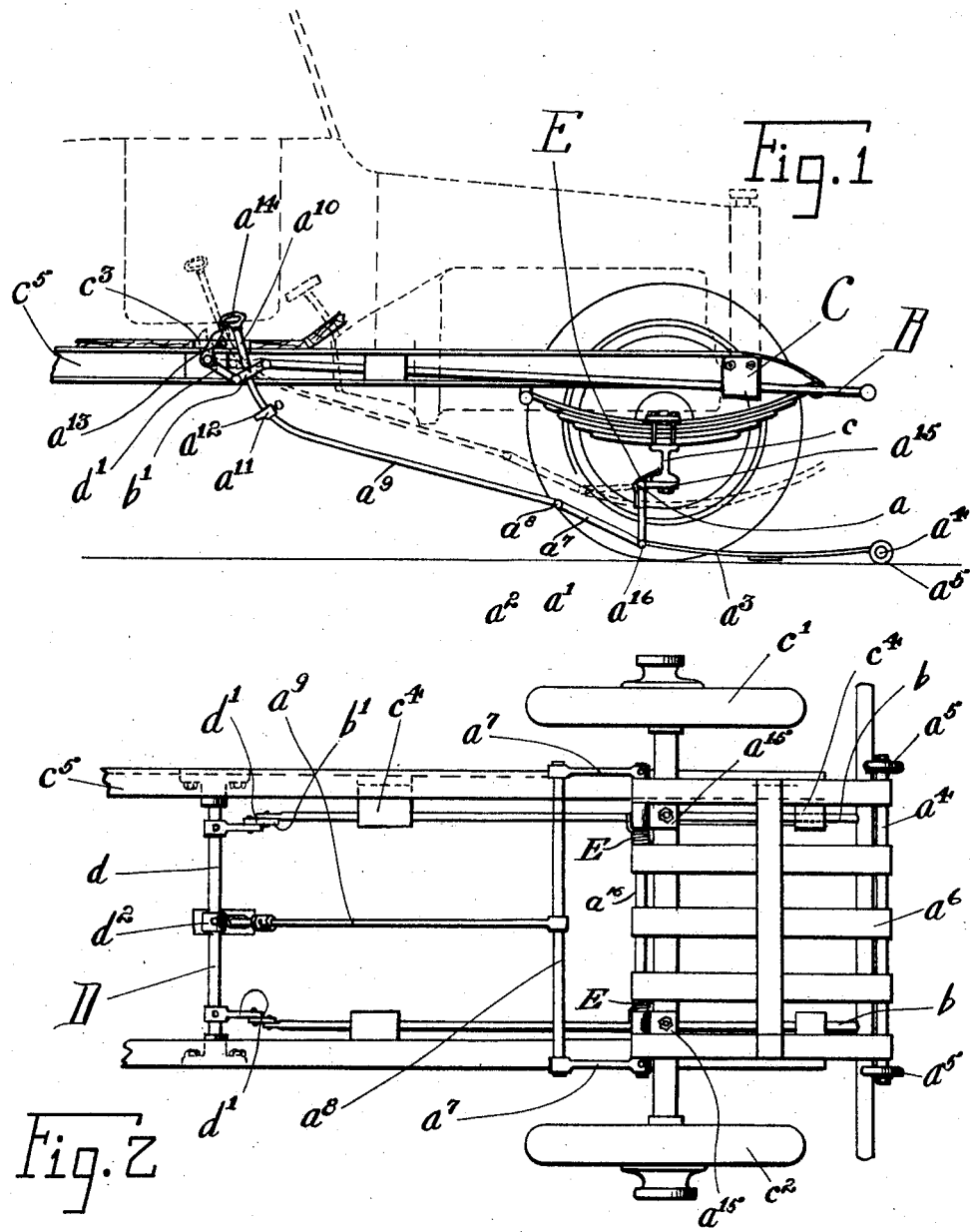

MICHAEL THIERY, OF CINCINNATI, OHIO.

SAFETY DEVICE FOR AUTOMOBILES.

1,388,981. Specification of Letters Patent. Patented Aug. 30, 1921.

Application filed April 22, 1921. Serial No. 463,690.

*To all whom it may concern:*

Be it known that I, MICHAEL THIERY, a citizen of the United States of America, and a resident of Cincinnati, in the county of Hamilton and State of Ohio, have invented a new and useful Improvement in a Safety Device for Automobiles, of which the following is a specification.

An object of my invention is to provide a device to be mounted upon an automobile, adapted to preclude foreign objects struck by the automobile from passing below and being run over by the automobile, such device being normally retained in an inoperative position and adapted to be moved to an operative position upon the impact of foreign objects upon the vehicle.

Another object is to provide a device for the purpose stated that may be automatically moved to an operative position or may be moved to such position by the operator of the automobile.

Another object of my invention is to provide a device for the purposes stated that is simple in construction and operation.

These and other objects are attained by the means described herein and disclosed in the accompanying drawings, in which—

Figure 1 is a fragmental sectional elevation of an automobile having a device embodying my invention mounted thereupon.

Fig. 2 is an inverted plan view of the device shown in Fig. 1.

My invention comprises a hanger $a^2$ pivotally mounted upon the automobile C, supporting a fender $a^3$ which may be projected forwardly under the automobile so as to prevent any foreign object that might be struck by the automobile from passing under the automobile.

The vehicle axle $c$ has mounted upon it, transversely to the automobile C, a shaft $a$ by any suitable means such as brackets $a^{15}$. A series of bars $a'$ is pivotally mounted upon the shaft $a$ and form a hanger $a^2$ having a transverse bar $a^{16}$ upon its lower end upon which is pivotally mounted a fender $a^3$. The fender $a^3$ is disposed intermediate the wheels $c'$ and $c^2$ of the automobile and has a transverse bar $a^4$ mounted upon its forward end and upon the ends of which are mounted the rollers or wheels $a^5$ adapted to engage a roadway when the fender is lowered or moved to its operative position. A series of cross bars $a^6$ are so attached to one another and to the transverse bars $a^4$ and the hanger $a^2$, that a fender or basket is provided, the fender being adapted to retain a foreign object and to preclude the passage of the foreign object under the body of the automobile. An arm $a^7$ is fixedly mounted upon each side of the basket and extends rearwardly therefrom beyond the hanger $a^2$. The rear ends of the arms are connected by a transverse bar $a^8$ upon which is mounted, preferably at or adjacent to the centermost portion thereof, a rod $a^9$ having its upper or rearmost end $a^{10}$ extending through a longitudinal slot $c^3$ in the floor of the automobile. It is preferable that the rod $a^9$ be pivotally mounted upon the transverse bar $a^8$. An adjustable catch $a^{11}$ is mounted upon the rod $a^9$ and has a finger or lug $a^{12}$ adapted to engage a retaining bar $a^{13}$ extending transversely through the longitudinal slot $c^3$. A handle $a^{14}$ is formed on the rearmost end of the rod $a^9$ whereby the rod may be pulled upward through the slot $c^3$ in order to cause the catch $a^{11}$ to engage and seat upon the retaining bar $a^{13}$. When the rod $a^9$ is pulled upward through the slot $c^3$, the hanger and the fender are moved about the transverse shaft $a$, and assume a position as shown in dotted lines in Fig. 1.

A bumper B is mounted upon the forward ends of the reciprocating rods $b$ mounted slidably upon the brackets $c^4$ mounted upon the automobile C. The rearmost ends of the reciprocating rods are pivotally connected to a bell crank lever D by means of links $b'$. The bell crank lever preferably comprises a transverse shaft $d$ revolubly mounted upon the frame $c^5$ of the automobile and having its arms $d'$ pivotally connected with the links $b'$. The arms $d'$ are duplicates and perform the function of a single arm of a bell crank lever in rotatably actuating the transverse shaft $d$. A trip lug $d^2$ corresponding to the second arm of a bell crank is mounted upon the transverse shaft $d$ and extends upwardly through the slot $c^3$ and is disposed to the rear of the retaining bar $a^{13}$. The second arm or trip lug $d^2$ is adapted to be moved into engagement with the rod $a^9$ and to dissociate the catch $a^{11}$ and the retaining bar $a^{13}$. Coil springs E are mounted upon the transverse shaft $a$ and each has one of its ends abutting upon the axle $c$, and has its other end abutting upon the rear of the hanger $a^2$, wherefore the springs tend to move the hanger and the fender forwardly and downwardly about the transverse shaft $a$.

The operation of my device is as follows: The rod $a^9$ is pulled upward through the slot $c^3$ and the catch $a^{11}$ engages upon the bar $a^{13}$, the trip lug is moved rearward and the bumper is moved forward. This also increases the strain placed upon springs E. The parts are retained in an elevated or inoperative position by the contact of the catch $a^{11}$ on the bar $a^{13}$. When the bumper B is moved rearwardly for any reason, such as striking a pedestrian, the transverse shaft $d$ is revolubly actuated so as to move the trip lug $d^2$ forward into engagement with the rod $a^9$ and to disengage the catch $a^{11}$ from the bar $a^{13}$, wherefore the springs E actuate the hanger revolubly about the transverse shaft $a$, and the fender is moved downwardly and forwardly and assumes the the position shown in full lines in Fig. 1.

The fender in this position catches the pedestrian in event he should fall in front of the machine, and carries the pedestrian along with the machine, thereby preventing the machine from running over him.

What I claim is:

1. The combination with an automobile of a fender, means pivotally mounting the fender below the front axle and intermediate the front wheels thereof and being adapted to be moved about its pivotal mounting to a position spaced from the roadway and to a position in immediate proximity to the roadway, and means operable from the driver's seat adapted to move the fender to either of its positions.

2. The combination with an automobile of an extensible fender, means to mount the fender upon the automobile intermediate the front wheels thereof, means to retain the fender in a normally contracted position below and immediately adjacent the bottom of the automobile, and means adapted to extend the fender to a position in immediate proximity to the roadway upon the striking of a foreign object by the automobile.

3. The combination with an automobile of a fender, means pivotally mounting the fender below the automobile body intermediate the front wheels and spaced from the roadway, means to normally retain the fender in immediate proximity to the automobile body, and means adapted to move the fender about its pivotal mounting to a position spaced from the automobile body and in immediate proximity with the roadway upon the striking of a foreign body by the automobile.

4. The combination with an automobile of a bumper slidably mounted upon the automobile, a fender, means for pivotally mounting the fender below the automobile body intermediate the front wheels, means to normally retain the fender in immediate proximity to the bottom of the automobile body, a catch adapted to retain the fender in its normal position, the bumper being adapted to render the catch inoperative while striking a foreign object, and means to space the fender from the automobile body and to position the fender immediately adjacent the roadway at and below the forward end of the automobile when the catch is rendered inoperative.

5. In a safety device for automobiles, the combination of a fender, means to mount the fender below the forward end of an automobile intermediate the front wheels, yieldable means normally retaining a fender in immediate proximity to the bottom of the automobile, a spring normally tending to move the fender forwardly and away from the body of the automobile, and means mounted on the automobile adapted to render the yieldable means inoperative upon contact with a foreign object.

6. In a safety device for automobiles, the combination of a hanger pivotally mounted on the automobile, a fender pivotally mounted on the hanger and adapted to assume a position in immediate proximity to the bottom of the automobile and a position to the front of the automobile intermediate the wheels, a rod mounted on the fender adapted to extend through the floor of the automobile, a catch mounted on the rod, a retaining bar adapted to be engaged by the catch and to thereby retain the fender in an inoperative position in immediate proximity to the bottom of an automobile, means adapted to yieldingly retain the fender in an operative position immediately adjacent the roadway, and a trip mechanism adapted to release the catch from the transverse bar upon engagement with a foreign object.

7. In a safety device for automobiles comprising the combination of a fender, a hanger pivotally mounting the fender below the automobile intermediate the front wheels, yielding means normally tending to retain the fender in an operative position immediately adjacent the roadway and spaced from the automobile body, a rod mounted on the fender and adapted to extend through the floor of the automobile body, a catch mounted on the rod, a transverse bar adapted to be engaged by the catch and to thereby retain the fender in an inoperative position in immediate proximity to the body of the automobile and spaced from the roadway against the action of the yielding means, a bumper mounted reciprocally upon the automobile, and a trip mechanism adapted to be actuated by the bumper and to thereby disengage the catch and the transverse bar.

8. In a safety device for automobiles comprising the combination of a fender, a hanger pivotally mounting the fender below the automobile intermediate the front wheels, yielding means normally tending to retain the fender in an operative position immediately adjacent the roadway and spaced from the automobile body, a rod mounted on the fender and adapted to extend through the floor of the automobile body, a catch mounted on the rod, a transverse bar adapted to be engaged by the catch and to thereby retain the fender in an inoperative position in immediate proximity to the body of the automobile and spaced from the roadway against the action of the yielding means, a bumper and a trip mechanism adapted to disengage the catch and the transverse bar, comprising a contact bar reciprocating rods adapted to be mounted upon the automobile body and supporting the contact bar, a revoluble shaft adapted to be mounted on the automobile adjacent the transverse bar, a tripping lug mounted on the revoluble shaft and adapted to engage the rod mounted on the fender, and a link connecting the reciprocating rods and the tripping lug.

9. The combination with an automobile of a fender mounted on the automobile adapted to assume a position in immediate proximity to a roadway and a position spaced from the roadway, and means operable from the driver's seat adapted to move the fender to either of its positions.

10. In a safety device for automobiles the combination of a hanger pivotally mounted on the automobile, a fender pivotally mouted on the hanger and adapted to assume a position in immediate proximity to the bottom of the automobile and a position to the front of the automobile intermediate the wheels, yieldable means normally retaining the fender in immediate proximity to the bottom of the automobile, means normally tending to move the fender forwardly and away from the body of the automobile, and means mounted on the automobile adapted to render the yieldable means inoperative upon contact with a foreign object.

11. The combination with an automobile of an extensible fender, means to mount the fender upon the automobile intermediate the front wheels thereof, means to retain the fender in a normally contracted position immediately adjacent the bottom of the automobile, means adapted to extend the fender to a position in immediate proximity to the roadway upon the striking of a foreign object by the automobile, and means operable from the driver's seat adapted to return the fender to its normally contracted position.

12. The combination with an automobile of an extensible fender, means to mount the fender upon the automobile intermediate the front wheels thereof, means to retain the fender in a normally contracted position immediately adjacent the bottom of the automobile, means adapted to extend the fender to a position in immediate proximity to the roadway upon the striking of a foreign object by the automobile, and means operable from the driver's seat adapted to render the fender retaining means inoperative and to return the fender to its normal position.

13. In a safety device for automobiles, the combination of a fender, means to mount the fender below the forward end of an automobile intermediate the front wheels, yieldable means normally retaining a fender in immediate proximity to the bottom of the automobile, a spring normally tending to move the fender forwardly and away from the body of the automobile, means mounted on the automobile adapted to render the yieldable means inoperative upon contact with a foreign object, and means operable from the driver's seat adapted to return the fender to the position in immediate proximity to the bottom of the automobile.

14. The combination with an automobile of a fender mounted on the automobile adapted to assume a position in immediate proximity to a roadway and a position spaced from the roadway, means adapted to move the fender from its second mentioned position to its first mentioned position upon the striking of a foreign object by the automobile, and means operable from the driver's seat adapted to move the fender to either of its positions.

In testimony whereof, I have hereunto subscribed my name this 18th day of April, 1921.

MICHAEL THIERY.